June 5, 1962 I. SZANISZLO' 3,037,523
MOTOR-COMPRESSOR VALVE SPECIFICALLY APT FOR
USE IN A REFRIGERATION SYSTEM
Filed July 14, 1958 3 Sheets-Sheet 2
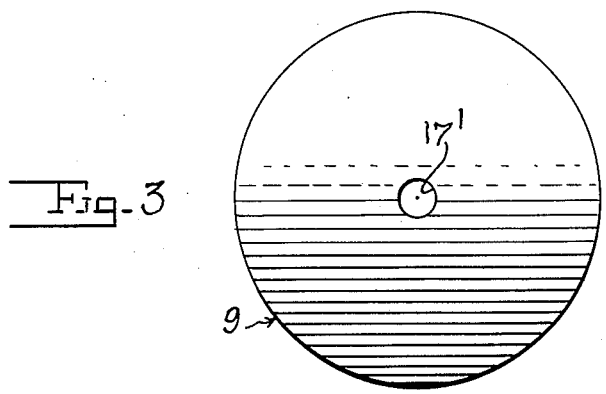
Fig-3
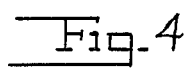
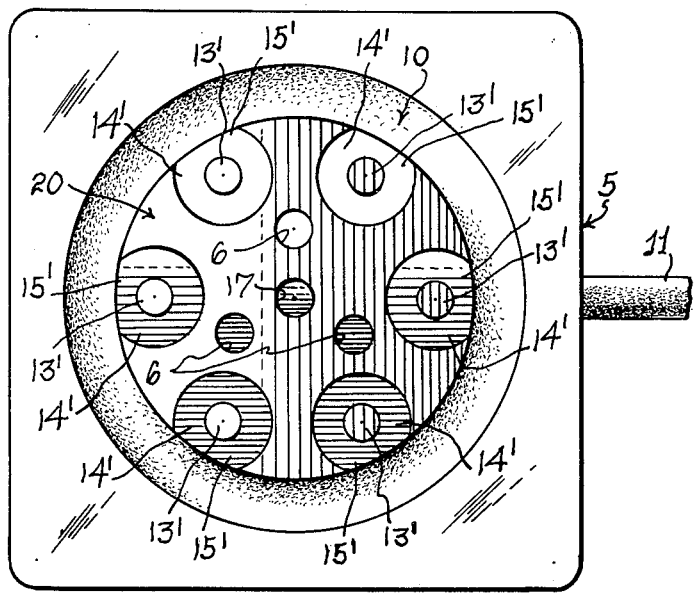
INVENTOR
ISTVAN SZANISZLO'
BY Irwin S. Thompson
ATTY.

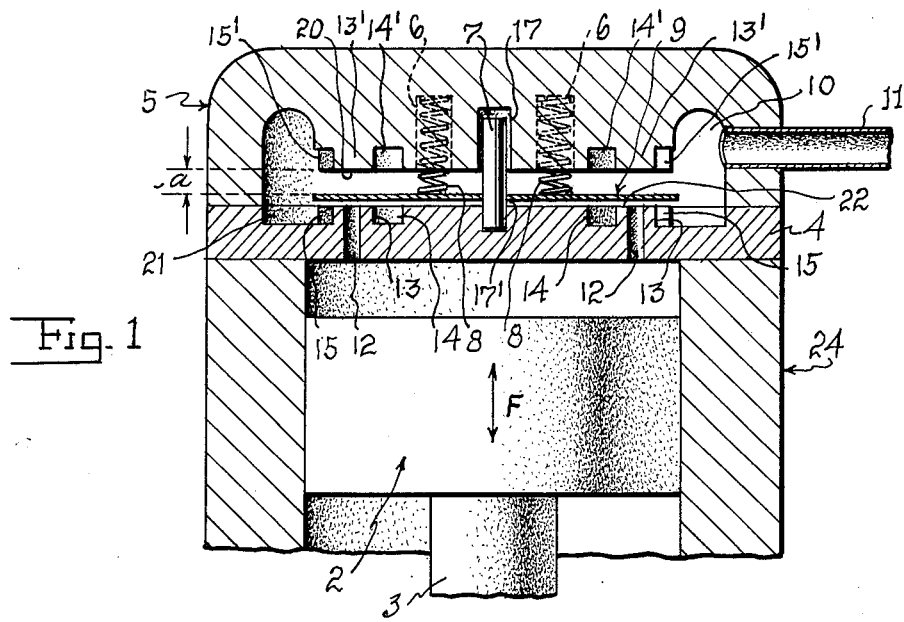
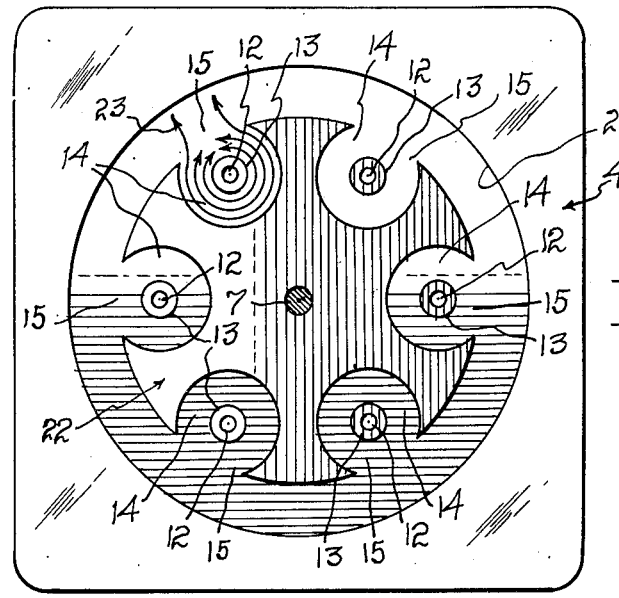

June 5, 1962  I. SZANISZLO'  3,037,523
MOTOR-COMPRESSOR VALVE SPECIFICALLY APT FOR
USE IN A REFRIGERATION SYSTEM
Filed July 14, 1958  3 Sheets-Sheet 3

INVENTOR
ISTVAN SZANISZLO'
BY Irwin C. Thompson
ATTY.

United States Patent Office 3,037,523
Patented June 5, 1962

3,037,523
MOTOR-COMPRESSOR VALVE SPECIFICALLY APT FOR USE IN A REFRIGERATION SYSTEM
Istvan Szaniszlo', Caronno Pertusella, Italy, assignor to Societa Italiana Telecomunicazioni Siemens-S.p.A.
Filed July 14, 1958, Ser. No. 748,390
Claims priority, application Italy Aug. 2, 1957
7 Claims. (Cl. 137—514)

This invention relates to a discharge valve assembly which comprises a disc valve which is parallel with respect to itself and to its seat during movement between a seat and a limit member, which are symmetrically disposed with regard to the disc valve. The axis of the disc valve is the same as that of the seat. The seat and the upper limit member are provided with a plurality of recesses or hollows, symmetrically disposed with regard to the seat axis and oppositely disposed.

It is known that disc discharge valves are preferred in compression units used in refrigeration systems. The different forms of construction of these valves have a decided shortcoming; e.g. a terrific impact takes place against the valve seat when the piston reaches the bottom point of its travel. The frequency of these impacts produces excessive noise during the operation of refrigerators.

An object of the present invention is to provide a substantially noiseless delivery disc valve, or head valve, for use in compressors of refrigerating systems.

It is another object of this invention to provide an improved valve of the disc type of simple low cost construction which is particularly suitable for compressors of the reciprocating type.

Further objects and advantages of the invention will become apparent as the following description proceeds, and the features of novelty which characterize the invention will be pointed out by the claims forming part of this specification.

Other objects and features of this invention will appear from the following description of preferred embodiments, in conjunction with the accompanying drawings, in which:

FIGURE 1 is a schematic longitudinal section of a compressor cylinder embodying the invention;

FIGURE 2 is a plan view of the valve seat shown in FIGURE 1;

FIGURE 3 is a plan view of the disc valve shown in FIGURE 1;

FIGURE 4 is a bottom view of the cylinder head showing the upper valve stroke limiting device;

Figure 5:
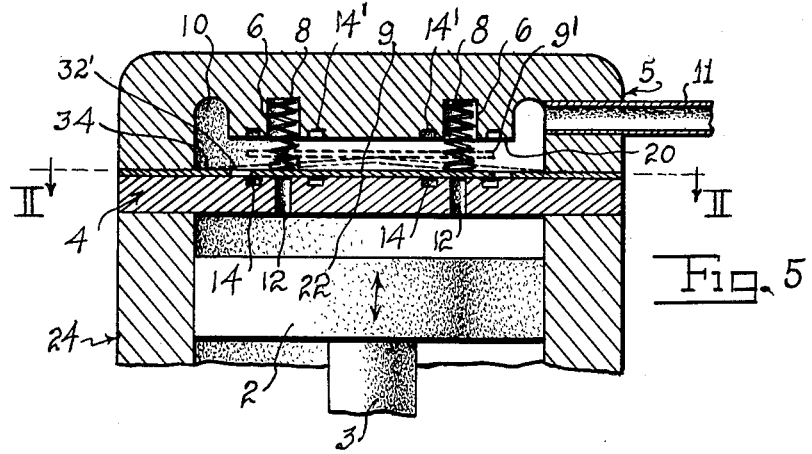
FIGURE 5 is a view similar to FIG. 1 showing a modified form of construction.

In FIG. 1 is shown a piston 2 driven by a rod 3 for reciprocating motion in cylinder 24 in the directions of the arrows F.

A valve seat 4 serving as a bottom disc valve stroke limiting device is mounted on top of cylinder 24 which cooperates with compressor head 5 to form the chamber 10. The seat 4 has an upper surface 22 and is provided with a plurality of holes 12 which provide communication between chamber 10 and the interior of cylinder 24. The holes 12 are arranged in a circle concentric with the axis of the cylinder 24, and each hole 12 is formed in or surrounded by a lug or tubular protuberance 13, the upper end of which is in the same plane as surface 22. Surrounding the protuberances 13 are concentric recesses or hollows 14 which open laterally through passages 15 into an annular channel 21 recessed in the valve seat plate 4 whereby recesses or hollows 14 communicate with channel 21.

The compressor head 5 has a bottom surface 20 which serves to limit the upper movement or stroke of the disc valve. Head 5 is provided with an opening 17 for receiving a pivot member 7. Openings 6 spaced symmetrically from the pivot 7 contain springs 8 urging disc valve 9 towards its seat. Recesses or hollows 14' are provided in compressor head 5 opposite recesses 14, and each has a lateral opening 15' providing communication with surrounding chamber 10. In the center of each recess or hollow 14' there is provided a lug 13' terminating in the same plane as bottom surface 20, but no holes are provided in lugs 13'. Lugs 13' are positioned opposite lugs 13. The compressor head 5 is provided with a gas discharge line 11 to the refrigeration system.

The disc valve 9 is slidably and centrally positioned on the guide pin or pivot 7 and has a stroke corresponding to the distance $a$. Springs 8 normally bias the disc valve 9 against the upper surface 22 of seat 4. When the piston 2 moves to its topmost end of its stroke, all gas present in the compression chamber of cylinder 24 will be forced through holes 12 thereupon moving disc valve 9 by symmetrically arranged forces against the symmetrical bias of springs 8.

The disc valve is subject to motion while parallel with itself between upper surface 22 and bottom surface 20. When the gas compression has been completed, the piston resumes its position at the bottom end of its stroke, while the cylinder pressure rapidly decreases. The disc valve 9, having been actuated against the bias of springs 8 by the symmetrical pressure of the compressed gas forced through holes 12, moves towards its lowermost position against upper surface 22 coincident with the movement of the piston to its bottom position. As the disc valve 9 resumes its seated position on upper surface 22, a braking action is effected against the disc valve 9 so as to substantially reduce the noise of it being seated on upper surface 22.

The braking action on disc valve 9 is brought about due to the fact that as the disc valve moves towards its seated position on upper surface 22 of member 4, a certain quantity of gas is still draining through holes 12 as a result of kinetic energy imparted to the gas which has been subjected to motion. In addition, the gas existing in each recess or hollow 14 is compressed with turbulent action as the valve moves towards its seat and serves as a gas cushion uniformly braking the movement of the valve. Due to the uniform arrangement of the recesses 14, the valve 9 is quietly allowed to seat.

The turbulence of flow of compressed gas from recesses or hollows 14 around lugs 13, as represented by 23 in FIG. 2, will decrease because as the gas tends to escape through opening 15 by flowing around lugs 13, the molecules of the gas collide, thereby losing speed and building up sufficient pressure resistance which produces a symmetrical braking action on disc valve 9. Without this braking effect, the aforesaid disc valve 9 would reach upper surface 22 of seat 4 with a violent impact, undoubtedly very noisy.

Due to the construction of the under surface of the cylinder head 5, a sudden noisy impact of disc valve 9 with the head 5 when the valve 9 is forced from its seat is avoided. In this connection the gas is compressed in the recesses 14' as the valve 9 moves towards head 5 and produces a braking action similar to that produced as valve 9 moves towards valve seat plate 4.

The size of opening 15 may be varied as desired and may even be eliminated.

Figure 6:
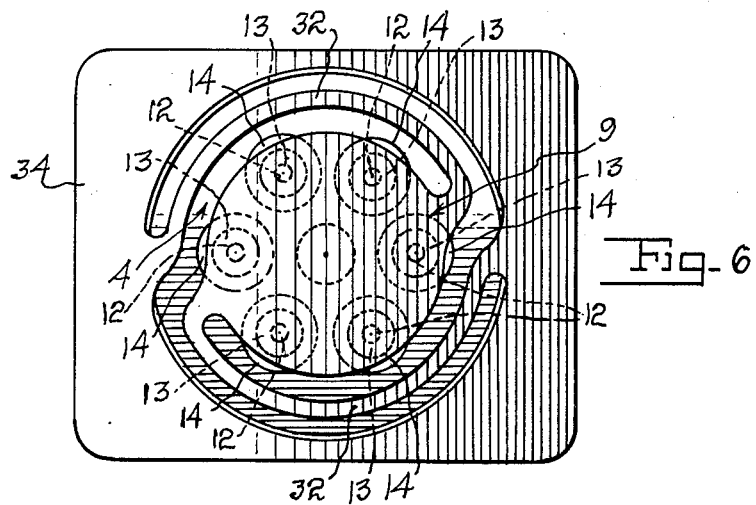
FIGURE 6 is a top plan view of the disc of FIGURE 5 taken on line II—II of FIGURE 5.
Figure 7:
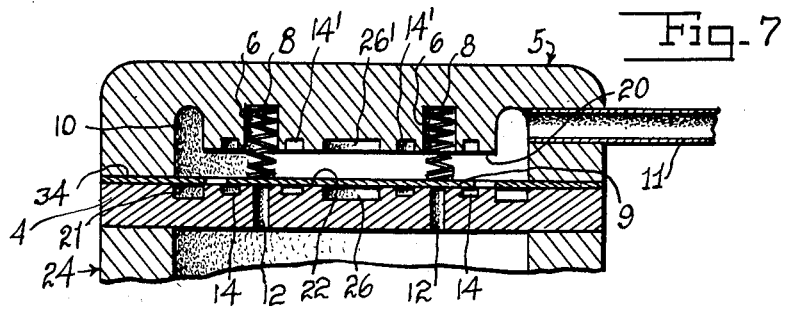
FIGURE 7 is another sectional view similar to that of FIGURE 1 embodying a still further modification.

In FIGS. 5–7, a disc valve 9 is shown which is not centered on a pivot, as shown in FIG. 1, but is resiliently secured to a fixed portion 34 secured between cylinder head 5 and seat 4.

The recesses or hollows 14 also do not contain lateral openings 15 as shown in FIG. 1. The disc valve 9 is connected to portion 34 by arms 32. Holes 6 which contain springs 8 are aligned with holes 12.

When the piston 2 moves to its upper position, the gas in cylinder 24 will be forced onto disc valve 9 through holes 12, and disc valve 9 will be raised against the bias of springs 8 to the position indicated by 9'. Arms 32 will also be raised to the position of 32'.

In FIG. 7 there are provided in the upper surface of seat 4 and the bottom surface of compressor head 5 recesses or hollows 26 and 26', respectively, which are located in the same plane as hollows 14 and 14'. The hollows 26 and 26' will result in a better balance during movement of disc valve 9.

While I have shown a particular embodiment of my invention in connection with a compression type refrigerating machine, I do not desire my invention to be limited to the particular construction shown and described, but I intend it to cover all modifications within the spirit and scope of the appended claims.

What I claim as new and desire to secure by Letters Patent is:

1. In combination with a disc valve, a lower stroke limiting seat provided with a plurality of outlet holes symmetrically disposed with respect to the disc valve axis, a plurality of hollows symmetrically disposed with respect to the disc valve axis, each hollow surrounding at least one of said outlet holes, an annular recess provided in said lower seat communicating with the periphery of each of said hollows, an upper stroke limiting seat provided with a plurality of further hollows symmetrically disposed with respect to the disc valve axis, said hollows in said lower seat specularly disposed with respect to said further hollows in said upper seat, an annular chamber provided in said upper seat communicating with the periphery of each of said further hollows, said annular chamber specularly disposed with respect to said annular recess, a discharge line connected to said chamber, said disc valve being interposed between said lower seat and said upper seat, and elastic means joined to said disc valve and said upper seat to bias said disc valve against said lower seat when in a closed position thereby overlapping said hollows and closing said outlet holes, and said disc valve overlapping said further hollows when in an open position.

2. The combination of claim 1 in which a guide pin is centrally positioned with respect to said disc valve and said lower and upper seat for slidably and reciprocably supporting and guiding said disc valve.

3. The combination of claim 1 in which said elastic means consist of openings symmetrically disposed with respect to the disc valve axis in said upper seat, and spring members arranged in said openings and being in connection with said disc valve.

4. In combination with a disc valve, a lower stroke limiting seat provided with a plurality of outlet holes symmetrically disposed with respect to the disc valve axis, a plurality of hollows symmetrically disposed with respect to the disc valve axis, each hollow surrounding at least one of said outlet holes, an upper stroke limiting seat provided with a plurality of further hollows symmetrically disposed with respect to the disc valve axis, said hollows in said lower seat specularly disposed with respect to said further hollows in said upper seat, an annular chamber provided in said upper seat and being disposed further from the disc valve axis than said further hollows, a discharge line connected to said chamber, said disc valve being interposed between said lower seat and upper seat, and elastic means joined to said disc valve and said upper seat to bias said disc valve against said lower seat when in a closed position thereby substantially overlapping said hollows and closing said outlet holes, and said disc valve substantially overlapping said further hollows when in an open position.

5. The combination of claim 4 in which said disc valve consists of two elastic arms joined to said disc valve and to a fixed portion secured between the upper seat and the lower seat, each arm disposed in the same plane as the disc valve and fixed portion, each arm provided with a configuration parallel to the perimeter of said valve disc, said valve disc overlapping all but a small portion of said hollows in said lower seat when in a closed position and all but a small portion of said further hollows of said upper seat whereby the small portions of said hollows communicate with said chamber when said valve disc is in the closed and open positions.

6. The combination of claim 4 in which said elastic means consist of openings disposed within said further hollows of said upper seat, the openings being specularly arranged with respect to said outlet holes, and spring members arranged in said openings and being in connection with said disc valve.

7. The combination of claim 4 in which a recess is provided in the axis of said lower seat and a further recess is provided in the axis of said upper seat, both recesses being specularly disposed with respect to each other.

References Cited in the file of this patent

UNITED STATES PATENTS

| | | |
|---|---|---|
| 402,647 | Beldam | May 7, 1889 |
| 588,456 | Mathewson | Aug. 17, 1897 |
| 1,299,762 | Nelson | Apr. 18, 1919 |
| 1,529,439 | Leinert | Mar. 10, 1925 |
| 1,608,616 | Prellwitz | Nov. 30, 1926 |
| 1,711,925 | Davis | May 7, 1929 |
| 1,768,638 | Sheats | July 1, 1930 |
| 2,036,799 | Duryee | Apr. 7, 1936 |
| 2,140,328 | Mozier | Dec. 13, 1938 |
| 2,231,904 | Gustafson | Feb. 18, 1941 |
| 2,344,818 | Hutton | Mar. 21, 1944 |
| 2,713,349 | Gibbs | July 19, 1955 |
| 2,728,351 | Cooper | Dec. 27, 1955 |

FOREIGN PATENTS

| | | |
|---|---|---|
| 390,531 | France | July 31, 1908 |
| 859,131 | France | May 27, 1940 |
| 185,016 | Austria | Mar. 26, 1956 |
| 1,139,509 | France | Feb. 11, 1957 |